United States Patent Office 2,913,703
Patented Nov. 17, 1959

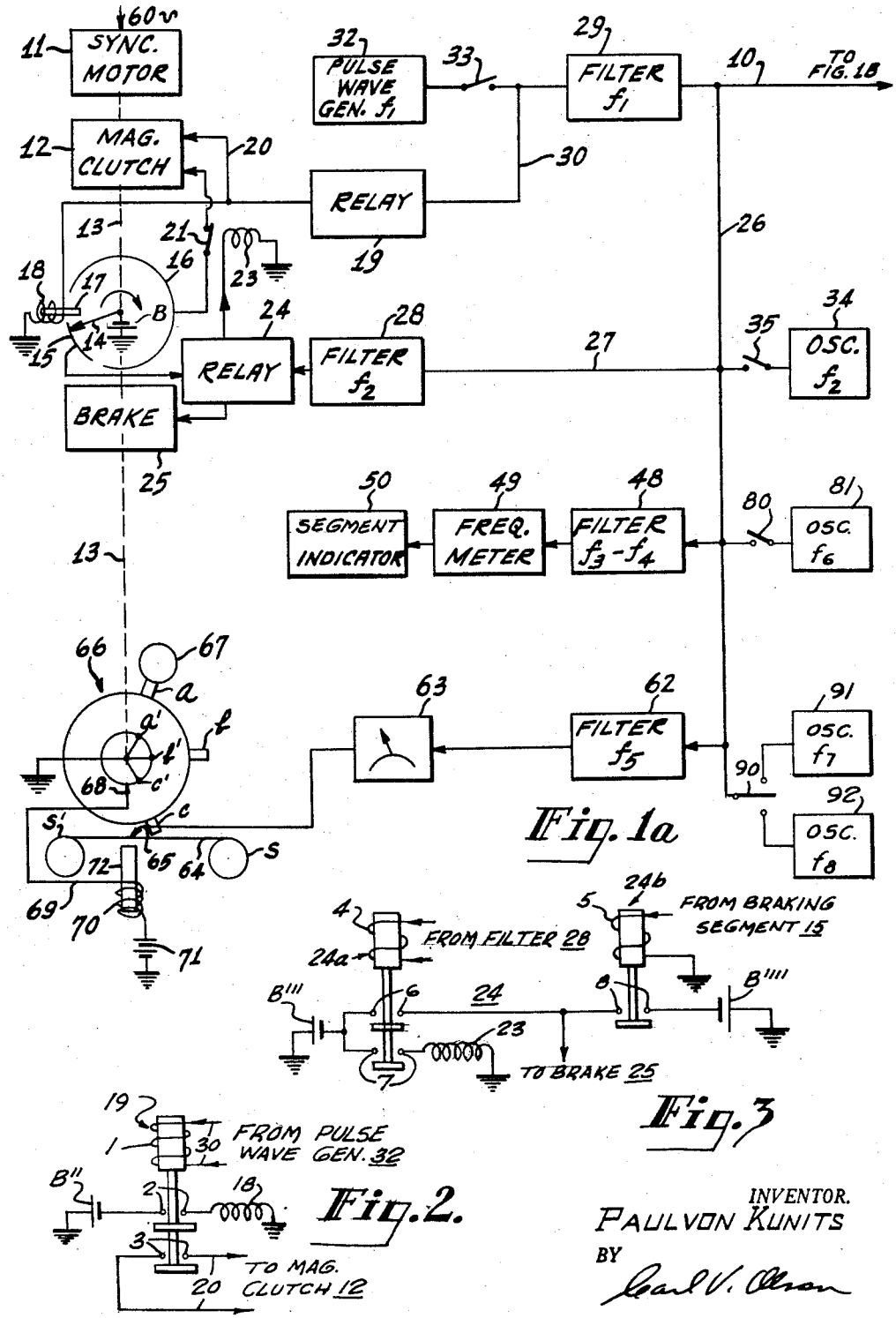

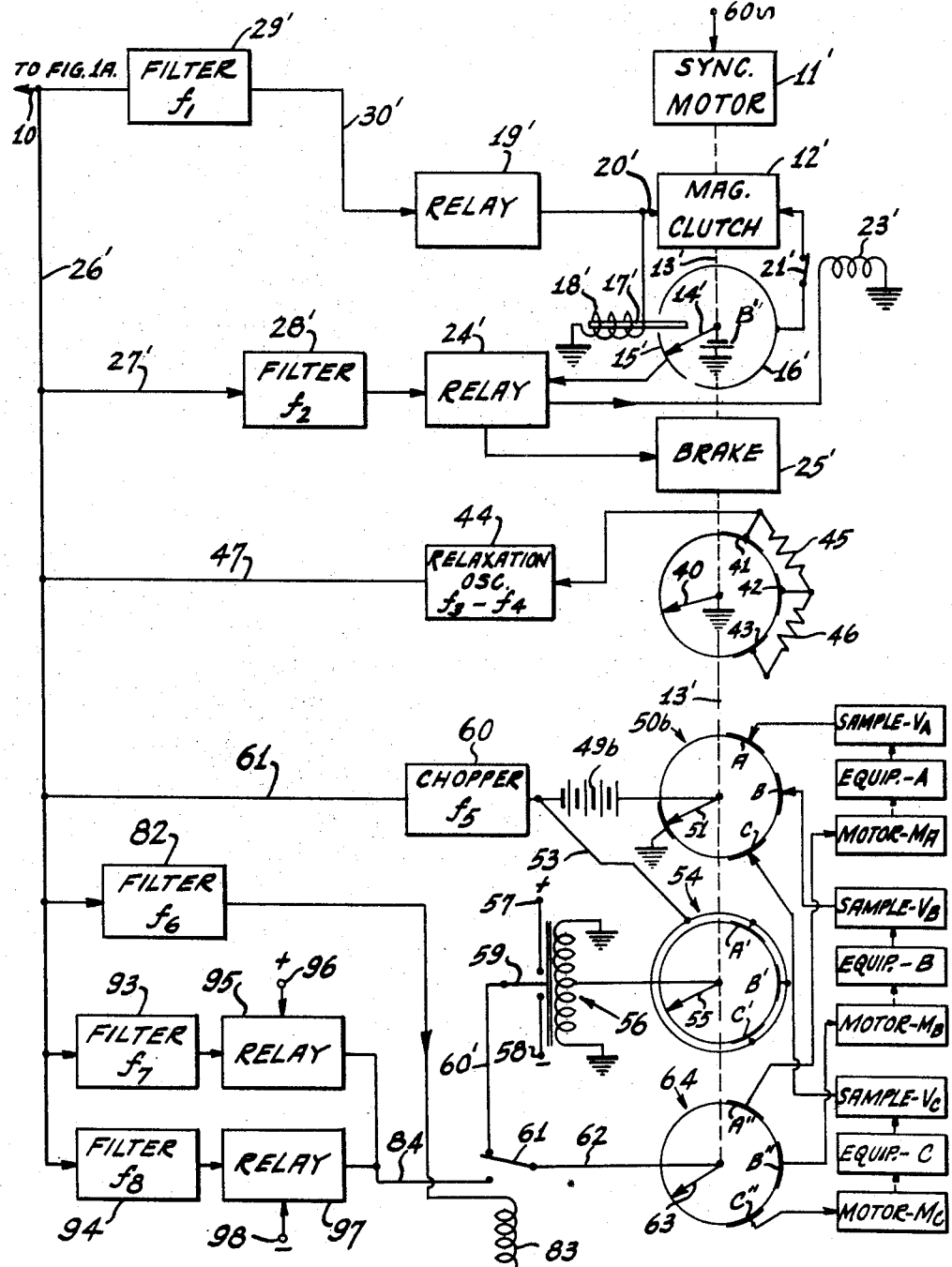

2,913,703

AUTOMATIC CONTROL SYSTEM WITH REMOTE SUPERVISION

Paul von Kunits, Whitestone, N.Y.

Application October 28, 1955, Serial No. 543,425

5 Claims. (Cl. 340—163)

This invention relates to an automatic control system for maintaining predetermined conditions in a plurality of equipments, and providing supervisory control from a remote location.

A general object of this invention is to provide an improved system for automatically maintaining a plurality of equipments in predetermined conditions of adjustment, and for reporting the actual conditions of adjustment to a remote point from which manual readjustments may be made.

Briefly, a system according to the invention may include an equipment location, such as the location of a radio transmitter, connected by means of a communications link to a remote location, such as a radio studio. The two locations are provided with multi-segment rotary switches driven in synchronism and in phase. Voltage samples of the equipment to be controlled are sequentially obtained by the rotary switch at the equipment location. The voltage samples, which may represent plate current, grid voltage, and antenna current, are compared with predetermined reference voltages and resulting correction voltages are automatically applied to motors associated with the respective equipment. The automatic correction system may be disabled from the remote location and manual controls may be used at the remote location to operate the motors. The conditions at the equipment location are reported to the remote location.

The foregoing and other objects and aspects of the invention will be apparent to those skilled in the art from the following more detailed description, taken in conjunction with the accompanying drawings, wherein:

Figures 1a and 1b, taken together, illustrate a control system constructed according to the teachings of this invention; and Figs. 2 and 3 are schematic diagrams of certain details of Fig. 1a.

Figure 1a shows the portion of the system at the remote location which may be a radio studio, and Figure 1b shows that portion of the system at the equipment location which may be the location of the radio transmitter. The two locations are coupled together by means of a communications link 10 which may be a wire line or a radio link.

At the remote location (Fig. 1a), a synchronous motor 11 has an output shaft connected thru a magnetic clutch 12 to rotate a shaft 13. The shaft 13 carries a contact arm 14 arranged to contact a braking segment 15 and a homing segment 16. A stopping pin 17 is arranged to mechanically stop the shaft 13 when the contact arm 14 is in the position shown in the drawing. The pin 17 may be withdrawn by means of a solenoid 18 operated from a relay 19. The output of relay 19 is also connected over lead 20 to the magnetic clutch 12. The magnetic clutch 12 includes a source of operating electric power and means to control the power in response to the signal over lead 20 from relay 19. A connection is completed from the homing segment 16 thru the normally closed switch 21 to the magnetic clutch 12. The switch 21 may be opened by means of a solenoid 23 operated from a relay 24. The relay 24 also operates a brake 25 on the shaft 13. A connection is made from the braking segment 15 to an input of the relay 24. A connection is made from the communications link 10 thru the bus 26, the lead 27 and the filter 28 (Fig. 1a) to another input of the relay 24. A connection is also made from the communications link 10 thru the filter 29 and the lead 30 to relay 19.

Fig. 2 is a detailed schematic of the circuitry of relay 19. Relay 19 has an A.C. energizing or operating coil 1 (adapted to be energized from a pulse wave generator 32 by way of leads 30 in a manner to be described hereinafter). Relay 19 has a first pair 2 of normally-open contacts, and a second pair 3 of normally-open contacts. One terminal of a source of power (illustrated as a battery B″) is connected to one of the contacts 2, and the other terminal of this source is connected to ground. One end of the solenoid 18 is connected to the other of the contacts 2, and the other end of this solenoid is grounded. When contacts 2 are closed in response to the energization of coil 1 of relay 19, solenoid 18 is energized from source B″ to withdraw pin 17. The lead 20 (control lead for magnetic clutch 12) actually consists of two leads one of which is connected to each of the contacts 3, in such a way that when contacts 3 are closed in response to the energization of coil 1 of relay 19, the operating electric power is applied to clutch 12.

Fig. 3 is a detailed schematic of the circuitry of relay 24. Relay 24 actually may comprise two separate portions 24a and 24b, portion 24a having an A.C. operating coil 4 and portion 24b having a D.C. operating coil 5. Coil 4 is adapted to be energized from the output of a filter 28, in a manner to be described hereinafter; coil 5 is adapted to be energized by a battery B by way of braking segment 15, in a manner to be described hereinafter. Relay portion 24a has a first pair 6 of normally-open contacts, and a second pair 7 of normally-open contacts. One terminal of a source of power (illustrated as a battery B‴) is connected to one of the contacts 6 and also to one of the contacts 7, and the other terminal of this source is connected to ground. One end of the solenoid 23 is connected to the other of the contacts 7, and the other end of this solenoid is grounded. When contacts 7 are closed in response to the energization of coil 4 of relay portion 24a, solenoid 23 is energized from source B‴ to open switch 21. A lead extends from that one of the contacts 6 not connected to source B‴ to brake 25, so that when contacts 6 are closed in response to the energization of coil 4, brake 25 is operated. Relay portion 24b has a single pair 8 of normally-open contacts. One terminal of a source of power (illustrated as a battery B″″) is connected to one of the contacts 8, and the other terminal of this source is connected to ground. A lead extends from the other of contacts 8 to brake 25, so that when contacts 8 are closed in response to the energization of coil 5, brake 25 is operated.

An arrangement similar to that thus far described in connection with the remote location of Figure 1a is also provided at the equipment location shown in Figure 1b. The same numeral designations are employed for the corresponding elements in Figure 1b, with prime designations added. At the remote location shown in Figure 1a, there is additionally provided a pulse wave generator 32 operating at a pulse repetition rate or frequency $f_1$. The output of the pulse wave generator 32 is applied thru a switch 33, and thru filter 29 to the communication link 10. The output of the pulse wave generator 32 is also applied thru lead 30 to the operating coil 1 of relay 19 to energize such coil. An oscillator 34 operating at a frequency $f_2$ is connected thru a switch 35 to the bus 26.

That part of the system thus far described operates to rotate shaft 13 at the remote location and shaft 13' at the equipment location in synchronism and in phase. Operation is initiated by closing switch 33 applying the output of pulse wave generator 32 thru lead 30 to the operating coil 1 of relay 19 and also thru filter 29, communications link 10 (all in Fig. 1a), and filter 29' to the operating coil of relay 19' (in Fig. 1b). The contacts of relays 19 and 19' operate to energize the respective magnetic clutches 12 and 12' and also to withdraw the respective stop pins 17 and 17'. The shafts 13 and 13' carrying the contact arms 14 and 14' are then driven around in a clockwise direction. The pulse from the pulse wave generator 32 ends before a complete revolution has been made with the result that the pins 17 and 17' fall back to the position shown in the drawing. However, the magnetic clutches 12 and 12' are maintained in the engaged condition by circuits from batteries B and B', thru the contact arms 14 and 14', the contact segments 16 and 16' and the switches 21 and 21' to the power control means in the clutches 12 and 12'. When the contact arms 14 and 14' leave the homing segments 16, 16', the magnetic clutches 12 and 12' are disengaged. When the contact arms 14, 14' engage the braking segments 15 and 15', circuits are completed from batteries B, B' to the operating coil 5 of relay 24 and to the D.C. operating coil of relay 24', operating the brakes 25 and 25' and bringing the shafts 13 and 13' to a stop at the stop pins 17 and 17'. The next pulse from the pulse wave generator 32 then repeats the process. It is thus apparent that the shafts 13 and 13' rotate in synchronism by reason of operation from synchronous motors having the same alternating current power source; for example the 60 cycle per second power supply shown, and operate in phase by reason of the start-stop phasing system.

The shafts 13 and 13' may be stopped at any desired angular position by closing the switch 35 to connect the output of oscillator 34 to the bus 26. The output of oscillator 34 is applied over lead 27 and thru filter 28 to the operating coil 4 of relay 24, and over bus 26, link 10, lead 27', and then thru filter 28' to the A.C. operating coil of realy 24'. The contacts of relays 24 and 24' energize the solenoids 23 and 23' to open the switches 21 and 21' thus deenergizing the magnetic clutches 12 and 12'. The relays 24 and 24' also actuate the brakes 25 and 25' to stop the shafts 13 and 13'. It is thus apparent that shafts 13 and 13' normally rotate in synchronism and in phase in a start-stop fashion, but that the shafts may be stopped at any desired angular position by closing the switch 35.

Means will now be described for determining the angular position of the shaft 13' at the equipment location, and indicating this position at the remote location. Different angular positions of the shafts 13 and 13' are assigned to different equipments. The shaft 13' carries a contact arm 40 which contacts segments 41, 42, and 43, corresponding with different equipments A, B, and C. A relaxation oscillator 44 is connected to the segments 41, 42, and 43 thru resistors 45 and 46. The frequency of the relaxation oscillator 44 varies in steps between frequency $f_3$ and frequency $f_4$ depending on the segments 41, 42, and 43 engaged by the contact arm 40 because the resistors are connected in the frequency determining portion of the relaxation oscillator. The output of the relaxation oscillator 44 is applied over lead 47, bus 26', communications link 10, and bus 26 (Fig. 1a) to filter 48 designed to pass frequencies in the range between $f_3$ and $f_4$. The signal passed by the filter 48 is applied to a frequency meter 49. The output of the frequency meter 49 is arranged to indicate the segment of the switch at the equipment location contacted by the arm 40. This may be done by calibrating the scale of the frequency meter 49. This function is represented in the drawings by the segment indicator 50.

The equipments controlled by and supervised by the system of this invention are represented as equipments A, B, and C. Any desired number of equipments may be controlled. The equipments provide sample voltages $V_A$, $V_B$, and $V_C$ representing conditions of adjustments of the respective equipments $V_A$, $V_B$, and $V_C$. Reversible motors $M_A$, $M_B$, and $M_C$ are mechanically connected to the respective equipments and are operative to adjust the respective equipments in response to electrical signals. The sample voltage from each equipment is compared with a reference voltage 49b by means of a comparison switch 50b. The switch 50b includes a contact arm 51 on the shaft 13' and contact segments A, B, and C corresponding with the respective equipments. If the sample voltage from a given equipment is larger or smaller than the reference value of the source 49b, a signal is applied over lead 53 to the contact segments A', B', and C' of a translator switch generally designated 54. The translator switch 54 includes a rotating contact arm 55 which is connected to a differential relay 56. When the relay is operated, the positive terminal 57 or the negative terminal 58 of a source of direct current is connected to the movable contact arm 59, the lead 60', the switch 61, and the lead 62 to the contact arm 63 of a motor switch generally designated by 64. The contact arm 63 engages the segments A'', B'', and C'' which are connected to the reversible motors $M_A$, $M_B$, and $M_C$ which latter are mechanically coupled to the respective equipments.

In operation, the contact arms of the switches 50b, 54, and 64 rotate with the shaft 13' and successively compare the sample voltages from the equipments A, B, and C with the reference voltage 49b. If a sample voltage of an equipment differs from the reference voltage, the difference is translated by means of the translator switch 54 and the differential relay 56 to a direct current voltage which is applied thru motor switch 64 to the corresponding motor. The motor operates in the proper direction to readjust the corresponding equipment. When the equipment reaches the predetermined condition of adjustment, the sample voltage from the equipment exactly equals the reference voltage from the source 49 so that no further correction by the motor is called for.

The time characteristics of the corrective mechanical motion applied to each equipment may be controlled by the initial choice of the speed of shaft 13', the length of each of the segments A, B, C, etc., and/or the use of discontinuous unit segments. Correction is made in a discontinuous "nudging" manner so that hunting and over-shooting is prevented. A false correction does not result from momentary conditions such as may be caused by a power supply fluctuation, and yet the correction can be made as fast as desired.

The difference signals resulting from the comparison of the sample voltages and the reference voltage 49b are also applied thru a chopper 60 operating at a frequency $f_5$, a lead 61, the bus 26', the communications link 10, the bus 26, and a filter 62 to a voltmeter 63 located at the remote location (Fig. 1a). The voltmeter 63 successively provides indications of the sample voltages from equipments A, B, and C. A recording mechanism may be associated with the voltmeter 63 to provide a permanent record of the operation of the equipments. The recording mechanism may consist of a moving chart 64 upon which a stylus 65 traces a line representing the voltages.

In order to identify the portions of the recorded line representing the sample voltages from the equipments A, B, and C, there is provided a printing wheel generally designated 66. The printing wheel includes rubber stamps $a$, $b$, and $c$ affixed thereto and rotatable therewith, corresponding with equipments A, B, and C. The rubber stamps are inked by a stationary rotating ink roller 67. The printing wheel 66 also includes rotating contacts a', b', and c', mechanically connected to the shaft 13. These rotating contacts engage a fixed contact 68 in synchronism with the sampling of the corresponding equipments at the equipment location. Circuits are completed from the rotating contacts a', b', or c', thru the fixed contact 68, the lead 69, the solenoid 70, and the battery 71. This results in the actuation of a plunger 72 which pushes the recording paper 64 against the rubber stamp, thus making an impression on the chart which identifies the particular voltage recorded by the stylus 65. Recording paper 64 continuously travels from a storage roller S to a take-up roller S'.

The equipment as thus far described operates automatically without human intervention in maintaining the equipments A, B, and C in predetermined conditions of adjustment. A printed record is also made of the conditions of adjustment. According to the invention, it is also possible to manually control the adjustment of the equipments, A, B, and C from the remote location. The automatic control is disabled and manual control of the equipment is taken by closing the switch 80 at the remote location to connect the output of an oscillator 81 to the bus 26, the communications link 10, and the bus 26'. The signal at frequency $f_6$ then passes thru the filter 82 and thru a solenoid 83. The solenoid 83 operates the switch 61 to make a connection from lead 62 to lead 84.

Control of the equipments A, B, and C may then be exercised from the remote location by operating the switch 90 to connect one or the other of oscillators 91 and 92 to the bus 26. The oscillator 91 operates at a frequency $f_7$ and the oscillator 92 operates at a frequency $f_8$. Signals from the oscillators 91 and 92 are applied thru bus 26, communications link 10, and bus 26' to the filters 93 and 94 at the equipment location. The filter 93 passes the signal from oscillator 91 and the filter 94 passes the signal from oscillator 92. A signal passing thru filter 93 operates a relay 95 which connects a positive potential from a source 96 thru the lead 84, the switch 61, and the lead 62 to the contact arm 63 of the motor switch 64. A signal passed by filter 94 is applied to a relay 97 which connects a negative potential from a source 98 thru lead 84, switch 61, and lead 62 to the contact arm 63 of the motor switch 64. The positive or negative voltage is applied from the contact arm 63 thru one of the segments A'', B'', or C'' to the motor corresponding with the equipment being adjusted. It is thus apparent that by operating the switch 90 at the remote location, the adjustment of one of the equipments A, B, or C may be performed.

The particular one of the equipments which is adjusted from the remote location is determined by the position at which the shaft 13' at the equipment location is stopped. Both the shafts 13 and 13' are stopped at the desired location by closing switch 35. This stops the shafts in the manner which has already been described. An indication of the position of the shaft 13' is given at the remote location by the segment indicator 50. After the manual adjustments have been completed, the system is returned to automatic operation by opening the switch 80 with the result that the switch 61 returns to the position shown in the drawing.

It is apparent that according to this invention the equipments A, B, and C are automatically maintained in predetermined conditions of adjustment, that visual and recorded indications of the conditions of the equipments are provided at the remote location, that the equipments may be manually adjusted from the remote location, and that corrections are accomplished in a discontinuous "nudging" manner.

What is claimed is:

1. An automatic control system for a plurality of equipments at an equipment location and under control from a remote location comprising a rotatable equipment selection shaft at the equipment location, motor means for rotating said shaft, a communications link between said equipment and remote locations, means to derive a sample voltage from each of said equipments, a correction motor connected to each of said equipments, a source of reference potential, a source of driving power for said correction motors, switching and comparison means mechanically coupled to said equipment selection shaft to selectively connect said sample voltages with the reference potential and to connect said source of driving power to said respective correction motors when a difference between the reference potential and the sample voltage exists, switching means responsive to a difference between the reference potential and the sample voltage to supply said driving power in a correcting sense to automatically maintain said equipments in predetermined conditions, a first oscillator at said remote location having an output connected to said communications link, filter and relay means coupled to said communications link at the equipment location to interrupt the connecting of said source of driving power to said correction motors in response to a signal from said first oscillator, a second oscillator at said remote location having an output coupled to said communications link, a second source of driving power for said correction motors, and second filter and relay means coupled to said communications link at said equipment location to connect said second source of driving power to said correction motors in response to a signal from said second oscillator.

2. An automatic control system for a plurality of equipments at an equipment location and under control from a remote location comprising a rotatable equipment selection shaft at the equipment location, motor means for rotating said shaft, a communications link between said equipment and remote locations, means to derive a sample voltage from each of said equipments, a correction motor connected to each of said equipments, a source of reference potential, a source of driving power for said correction motors, switching and comparison means mechanically coupled to said equipment selection shaft to selectively connect said sample voltages with the reference potential and to connect said source of driving power to said respective correction motors when a difference between the reference potential and the sample voltage exists, switching means responsive to a difference between the reference potential and the sample voltage to supply said driving power in a correcting sense to automatically maintain said equipments in predetermined conditions, a first oscillator at said remote location having an output connected to said communications link, filter and relay means coupled to said communications link at the equipment location to interrupt the connecting of said source of driving power to said correction motors in response to a signal from said first oscillator, a second oscillator at said remote location having an output coupled to said communications link, a second source of driving power for said correction motors, second filter and relay means coupled to said communications link at said equipment location to connect said second source of driving power to said correction motors in response to a signal from said second oscillator, a third oscillator having an output frequency which varies with the angular position of said equipment selection shaft, means coupling the output of said third oscillator to said communications link, a third filter and frequency meter means coupled to said communications link at said remote location to indicate the frequency of said third oscillator, and means responsive to said equipment selection shaft to calibrate said frequency meter means in terms of the angular position of the equipment selection shaft and of the particular one of the plurality of equipments corresponding to such angular position.

3. An automatic control system for a plurality of equipments at an equipment location and under control from a remote location comprising a rotatable equipment selection shaft at the equipment location, motor means for rotating said shaft, a communications link between said equipment and remote locations, means to derive a sample voltage from each of said equipments, a correction motor connected to each of said equipments, a source of reference potential, a source of driving power for said correction motors, switching and comparison means mechanically coupled to said equipment selection shaft to selectively connect said sample voltages with the reference potential and to connect said source of driving power to said respective correction motors when a difference between the reference potential and the sample voltage exists, switching means responsive to a difference between the reference potential and the sample voltage to supply said driving power in a correcting sense to automatically maintain said equipments in predetermined conditions, a first oscillator at said remote location having an output connected to said communications link, filter and relay means coupled to said communications link at the equipment location to interrupt the connecting of said source of driving power to said correction motors in response to a signal from said first oscillator, a second oscillator at said remote location having an output coupled to said communications link, a second source of driving power for said correction motors, second filter and relay means coupled to said communications link at said equipment location to connect said second source of driving power to said correction motors in response to a signal from said second oscillator, a third oscillator having an output frequency which varies with the angular position of said equipment selection shaft, means coupling the output of said third oscillator to said communications link, a third filter and frequency meter means coupled to said communications link at said remote location to indicate the frequency of said third oscillator, means responsive to said equipment selection shaft to calibrate said frequency meter means in terms of the angular position of the equipment selection shaft and of the particular one of the plurality of equipments corresponding to such angular position, a chopper at said equipment location having an input coupled to said switching and comparison means to periodically interrupt the difference voltage therefrom, means coupling the output of said chopper to said communications link, a fourth filter at said remote location having an input coupled to said communications link and designed to pass the frequency of said chopper, and voltage indicating means coupled to the output of said fourth filter, whereby the conditions of said equipment can be observed at the remote location.

4. An automatic control system for a plurality of equipments at an equipment location and under control from a remote location comprising a rotatable equipment selection shaft at the equipment location, motor means for rotating said shaft, a communications link between said equipment and remote locations, means to derive a sample voltage from each of said equipments, a correction motor connected to each of said equipments, a source of reference potential, a source of driving power for said correction motors, switching and comparison means mechanically coupled to said equipment selection shaft to selectively compare said sample voltages with the reference potential and to connect said source of driving power to said respective correction motors when a difference between the reference potential and the sample voltage exists, switching means responsive to a difference between the reference potential and the sample voltage to supply said driving power in a correcting sense to automatically maintain said equipments in predetermined conditions, a first oscillator at said remote location having an output connected to said communications link, and means coupled to said communications link at the equipment location acting in response to a signal from said first oscillator to interrupt the connecting of said source of driving power to said correction motors.

5. An automatic control system for a plurality of equipments at an equipment location and under control from a remote location comprising a rotatable equipment selection shaft at the equipment location, motor means for rotating said shaft, a communications link between said equipment and remote locations, means to derive a sample voltage from each of said equipments, a correction motor connected to each of said equipments, a source of reference potential, a source of driving power for said correction motors, switching and comparison means mechanically coupled to said equipment selection shaft to selectively connect said sample voltages with the reference potential and to connect said source of driving power to said respective correction motors when a difference between the reference potential and the sample voltage exists, switching means responsive to a difference between the reference potential and the sample voltage to supply said driving power in a correcting sense to automatically maintain said equipments in predetermined conditions, a first oscillator at said remote location having an output connected to said communications link, first frequency selective means coupled to said communications link at the equipment location acting in response to a signal from said first oscillator to interrupt the connecting of said source of driving power to said correction motors, a second oscillator at said remote location having an output coupled to said communications link, a second source of driving power for said correction motors, and second frequency selective means coupled to said communications link at the equipment location acting in response to a signal from said second oscillator to connect said second source of driving power to said correction motors.

References Cited in the file of this patent

UNITED STATES PATENTS

| Number | Name | Date |
|---|---|---|
| 1,699,759 | Shephered | Jan. 22, 1929 |
| 1,745,071 | Wensley | Jan. 28, 1930 |
| 1,786,780 | Shephered | Dec. 30, 1930 |
| 1,803,614 | Hershey | Mar. 5, 1931 |
| 1,965,393 | Schleicher et al. | July 3, 1934 |
| 2,061,410 | Stablein | Nov. 17, 1936 |
| 2,113,436 | Williams | Apr. 5, 1938 |
| 2,125,093 | White | July 26, 1938 |
| 2,520,462 | Hartung | Aug. 29, 1950 |
| 2,530,750 | Yardeny et al. | Nov. 21, 1950 |
| 2,643,172 | Reiss | June 23, 1953 |
| 2,664,530 | Young | Dec. 29, 1953 |
| 2,736,006 | Langevin | Feb. 21, 1956 |